US010332271B2

(12) United States Patent
Du et al.

(10) Patent No.: US 10,332,271 B2
(45) Date of Patent: Jun. 25, 2019

(54) APPARATUS AND METHOD FOR DETECTING MULTILAYER MULTIPASS WELDING TRAJECTORY

(71) Applicant: Tsinghua University, Beijing (CN)

(72) Inventors: Dong Du, Beijing (CN); Jinle Zeng, Beijing (CN); Li Wang, Beijing (CN); Baohua Chang, Beijing (CN); Shuhe Chang, Beijing (CN); Guodong Peng, Beijing (CN); Wenzhu Wang, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 152 days.

(21) Appl. No.: 15/641,798

(22) Filed: Jul. 5, 2017

(65) Prior Publication Data
US 2018/0268562 A1 Sep. 20, 2018

(30) Foreign Application Priority Data

Mar. 14, 2017 (CN) .......................... 2017 1 0155011

(51) Int. Cl.
*H04N 9/47* (2006.01)
*H04N 7/18* (2006.01)
*G06T 7/70* (2017.01)
*G06T 7/00* (2017.01)
*H04N 5/225* (2006.01)
(Continued)

(52) U.S. Cl.
CPC .............. *G06T 7/70* (2017.01); *B23K 9/0282* (2013.01); *B23K 9/0956* (2013.01); *G06T 7/0004* (2013.01); *H04N 5/2256* (2013.01); *B23K 2101/06* (2018.08); *G06T 2207/10016* (2013.01); *G06T 2207/30152* (2013.01); *G06T 2207/30164* (2013.01); *G06T 2207/30241* (2013.01)

(58) Field of Classification Search
USPC ......................................... 348/90, 61, 42, 46
See application file for complete search history.

(56) References Cited

U.S. PATENT DOCUMENTS 4,412,121 A * 10/1983 Kremers ................ B23K 37/04
219/124.34
2008/0061113 A9 * 3/2008 Seki ..................... B23K 9/0953
228/103

(Continued)

*Primary Examiner* — Daquan Zhao
(74) *Attorney, Agent, or Firm* — Hodgson Russ LLP

(57) ABSTRACT

Apparatuses and methods for detecting multilayer multipass welding trajectory are disclosed. The apparatus includes an imaging component, a first and a second directional light source group, a structured light source and a control and processing component. The imaging component is disposed in front of a welding gun and above a weld pass. The first and the second directional light source group are disposed symmetrically above the weld pass and at two sides of the weld pass. The structured light source is disposed above the weld pass. The control and processing component is configured to control the imaging component to capture an image of the workpiece surface separately when the first directional light source group, the second directional light source group or the structured light source emits the light to the workpiece surface and to obtain a multilayer multipass welding trajectory according to the images.

8 Claims, 6 Drawing Sheets

(51) Int. Cl.
*B23K 9/028* (2006.01)
*B23K 9/095* (2006.01)
*H04N 13/00* (2018.01)
*B23K 101/06* (2006.01)

(56) References Cited

U.S. PATENT DOCUMENTS

2010/0224610 A1* 9/2010 Wallace ............... B23K 9/0953
                                                          219/137 R
2012/0318775 A1* 12/2012 Schwarz ............. B23K 26/032
                                                         219/121.63

* cited by examiner

APPARATUS AND METHOD FOR DETECTING MULTILAYER MULTIPASS WELDING TRAJECTORY

CROSS-REFERENCE TO RELATED APPLICATION

This application claims priority to Chinese Patent Application Serial No. 201710155011.0, filed with the State Intellectual Property Office of P. R. China on Mar. 14, 2017, the entire content of which is incorporated herein by reference.

FIELD

The present disclosure relates to a field of welding automation, and particularly, to an apparatus and method for detecting a multilayer multipass welding trajectory.

BACKGROUND

Medium thickness plates in energy, chemical industry, marine engineering and other fields often need to be formed by multilayer multipass welding method. For ensuring the quality of welding products, it is of great significance to recognize a trajectory position to be welded by visual methods and adjust relative positions between a welding gun and a workpiece, so as to compensate an offset (caused by dimensional deviation, positioning errors of tools, welding thermal deformation and other factors) between an actual weld pass trajectory and a movement trajectory predetermined by an motion actuator.

SUMMARY

Embodiments of the present disclosure provide an apparatus for detecting a multilayer multipass welding trajectory. The apparatus includes an imaging component, a directional light source array, a structured light source and a control and processing component. The directional light source array includes a first directional light source group and a second directional light source group. The imaging component is disposed in front of a welding gun and above a weld pass. The first directional light source group and the second directional light source group are disposed above the weld pass and symmetrically at two sides of the weld pass. The structured light source is disposed above the weld pass and in front of the welding gun. The control and processing component is configured to control the first directional light source group, the second directional light source group and the structured light source to emit light sequentially. The control and processing component is configured to control the imaging component to capture a workpiece surface image separately when the first directional light source group, the second directional light source group or the structured light source is turned on alone to emit the light to a weld pass surface, and the control and processing component is configured to obtain a multilayer multipass welding trajectory according to the captured images.

Embodiments of the present disclosure also provide a method for detecting a multilayer multipass welding trajectory. The method is applied to the above apparatus for detecting a multilayer multipass welding trajectory. The method is performed by the control and processing component and includes the following actions:

action 1: denoting the first directional light source group, the second directional light source group, and the structured light source by a light source $L_1$, a light source $L_2$, and a light source $L_3$; supposing $\xi$, $\zeta$, $\eta$ to be any arrangement of the numbers 1, 2 and 3, in which $\xi$, $\zeta$, $\eta$ are positive integers that are not equal to each other; supposing num to be the total number of workpiece surface images captured by the imaging component in a welding process, in which num is a multiple of 3; supposing lime to be the total time required to capture num workpiece surface image(s) by the imaging component in the welding process; supposing t to be any non-negative time that is not greater than Time; letting T be Time/num; supposing n to be any nonnegative integer less than num/3;

action 2: at any time of $3nT<t<(3n+1)T$, emitting a first control signal to make the light source $L_\xi$ turn on and to make the light source $L_\zeta$ and the light source $L_\eta$ turn off, and enabling the imaging component to capture the workpiece surface image when the light source $L_\xi$ is turned on alone;

action 3: at any time of $(3n+1)T<t<(3n+2)T$, emitting a second control signal to make the light source $L_\zeta$ turn on and to make the light source $L_\xi$ and the light source $L_\eta$ turn off, and enabling the imaging component to capture the workpiece surface image when the light source $L_\zeta$ is turned on alone;

action 4: at any time of $(3n+2)T<t<(3n+3)T$, emitting a third control signal to make the light source $L_\eta$ turn on and to make the light source $L_\xi$ and the light source $L_\zeta$ turn off, and enabling the imaging component to capture the workpiece surface image when the light source $L_\eta$ is turned on;

action 5: if an angle between a weld pass trajectory to be detected and a column coordinate axis of the workpiece surface image is not more than 45°, supposing the workpiece surface images captured by the imaging component to be image $I_{1,n}(x,y)$, image $I_{2,n}(x,y)$ and image $I_{3,n}(x,y)$ when the first directional light source group, the second directional light source group and the structured light source are separately turned on at the time of $3nT<t<(3n+3)T$; if the angle between the weld pass trajectory to be detected and the column coordinate axis of the workpiece surface image is greater than 45°, supposing image $I_{1,n}(x,y)$, image $I_{2,n}(x,y)$ and image $I_{3,n}(x,y)$ to be the images obtained by rotating 90° from the workpiece surface images captured by the imaging component when the first directional light source group, the second directional light source group and the structured light source are separately turned on at the time of $3nT<t<(3n+3)T$; x and y are any positive integers representing row and column coordinates of the workpiece surface image, respectively, and $x \leq M$, $y \leq N$, in which M and N represent the total number of rows and the total number of columns of the workpiece surface image, respectively;

action 6: when $n \geq 2$, processing the image $I_{1,n}(x,y)$, image $I_{2,n}(x,y)$ and image $I_{3,n}(x,y)$, obtaining three-dimensional position information of weld pass boundary points according to a processed result of the image $I_{1,n}(x,y)$, image $I_{2,n}(x,y)$ and image $I_{3,n}(x,y)$, and finally achieving a multilayer multipass welding trajectory detection according to the three-dimensional position information.

Figure 1:
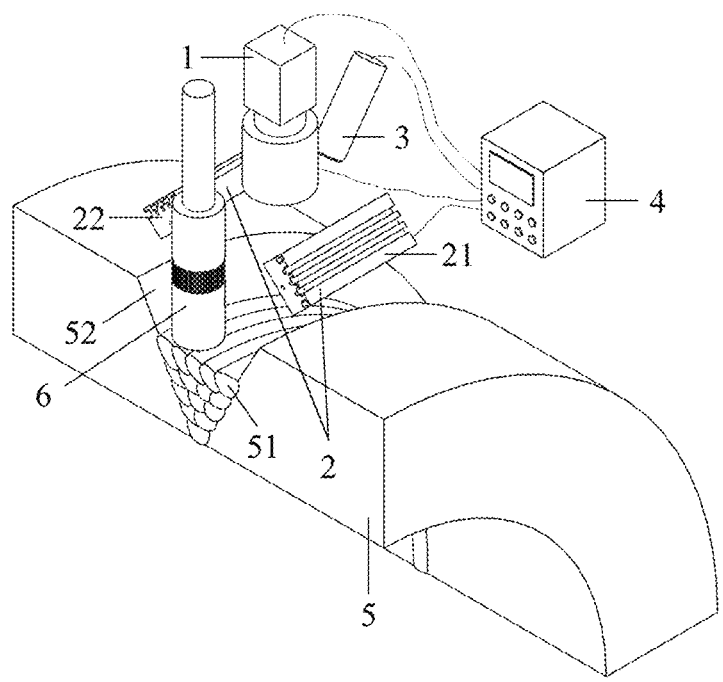
FIG. 1 is an axonometric view of an apparatus for detecting a multilayer multipass welding trajectory according to an embodiment of the present disclosure.

REFERENCE NUMERALS 1 imaging component, 2 directional light source array, 21 first directional light source group, 22 second directional light source group, 3 structured light source, 4 control and processing component, 5 workpiece, 51 weld pass, 52 groove sidewall, 6 welding gun;
num: the total number of workpiece surface images captured by the imaging component in a welding process;
Time: a total time required to capture num workpiece surface image(s) by the imaging component in the welding process;
t: any non-negative time that is not greater than Time;
$S_1, S_2, S_3, S_4$: four square wave signals emitted by the control and processing component;
α: weld toe angle at a weld pass boundary;
β: projection angle of the first directional light source group;
x: any positive integer representing the row coordinate of the workpiece surface image;
y: any positive integer representing the column coordinate of the workpiece surface image;
K: any positive integer greater than the number of the weld passes to be detected;
Π: top K points with largest gradient values in each row of FIG. 14;
$p_{0,n}(y)$: the number of points H in the $y^{th}$ column of FIG. 14;
$p_n(y)$: result obtained by performing low-pass filtering on $p_{0,n}(y)$;
$\varepsilon_n(y)$: row coordinate of a midpoint of a longest continuous line segment in the $y^{th}$ column of a binary image obtained by applying thresholding to FIG. 11;
$q_n(y)$: second derivative of $\varepsilon_n(y)$;
R: weld pass boundary point set.

DETAILED DESCRIPTION

Principles of an apparatus and a method for detecting a multilayer multipass welding trajectory according to embodiments of the present disclosure will be further elaborated with reference to the accompanying drawings, in which the apparatus and the method are based on fusion of multiple visual information.

Figure 2:
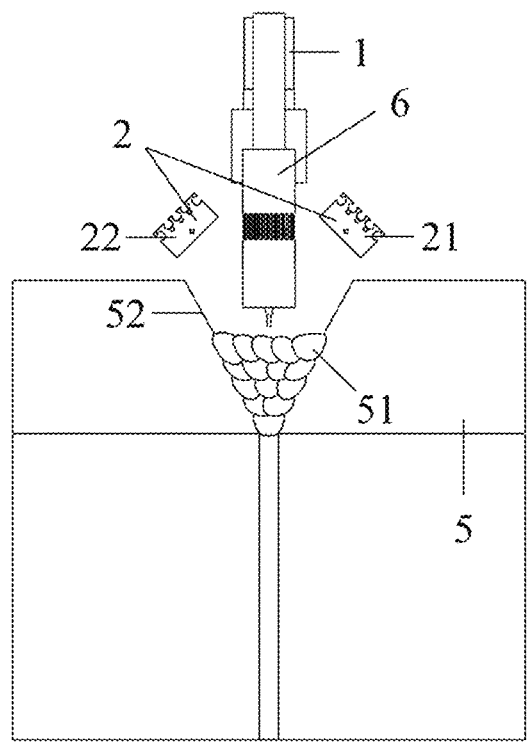
FIG. 2 is a front view of the apparatus shown in FIG. 1.
Figure 3:
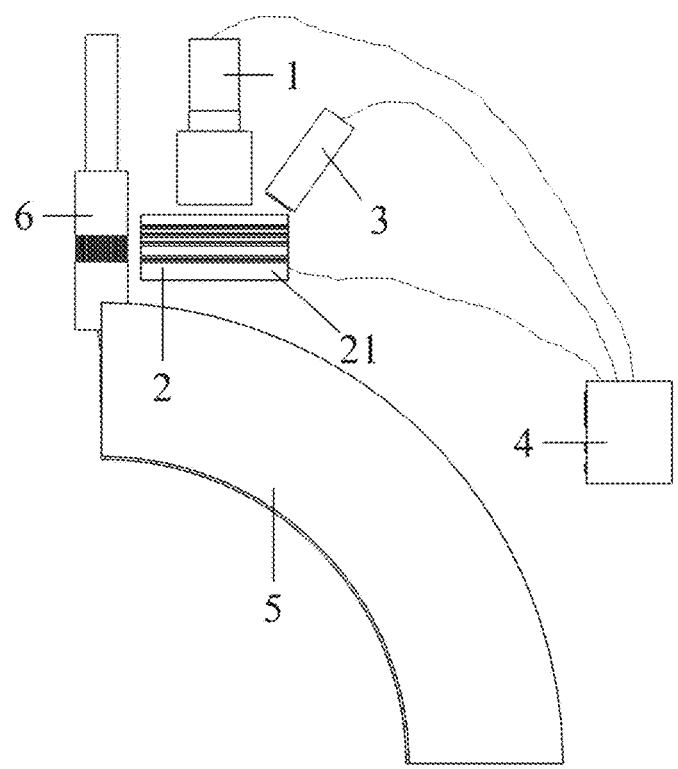
FIG. 3 is a side view of the apparatus shown in FIG. 1.
Figure 4:
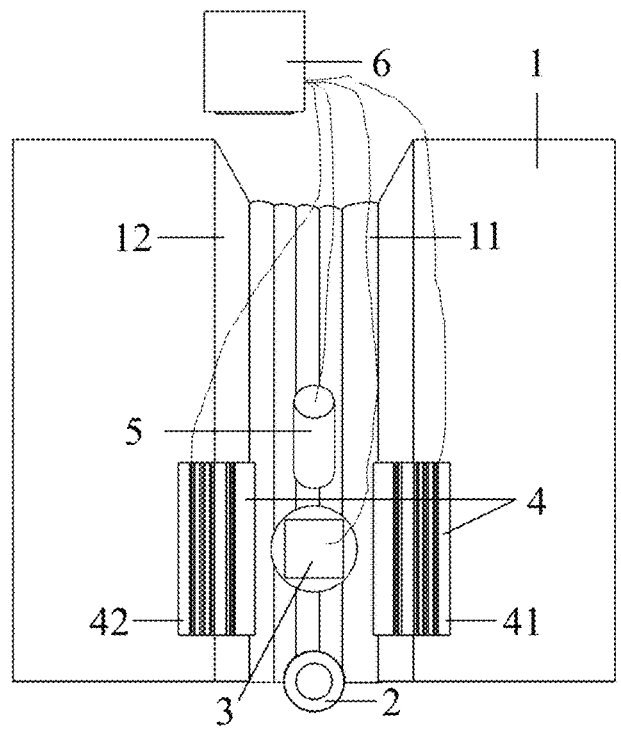
FIG. 4 is a top view of the apparatus shown in FIG. 1.

FIG. 1 is an axonometric view of an apparatus for detecting a multilayer multipass welding trajectory according to an embodiment of the present disclosure, and FIGS. 2, 3 and 4 show a front view, a side view and a top view of the apparatus in FIG. 1 respectively. The apparatus includes an imaging component 1, a directional light source array 2, a structured light source 3 and a control and processing component 4. The directional light source array 2 includes a first directional light source group 21 and a second directional light source group 22. The first directional light source group 21 and the second directional light source group 22 are disposed above a weld pass 51 to be detected and symmetrically at two sides of the weld pass 51. The light emitted by the first directional light source group 21, the second directional light source group 22 and the structured light source 3 projects to a weld pass surface. The imaging component 1 is configured to capture a workpiece surface image separately when the first directional light source group 21, the second directional light source group 22 or the structured light source 3 is turned on alone.

In an embodiment of the present disclosure, positions of the imaging component 1, the directional light source array 2, the structured light source 3 and a welding gun 6 are relatively fixed.

In an embodiment of the present disclosure, the control and processing component 4 is connected with the first directional light source group 21, the second directional light source group 22, the structured light source 3 and the imaging component 1 by wires or communicates with them through wireless transmission.

The control and processing component 4 is configured to control the first directional light source group 21, the second directional light source group 22 and the structured light source 3 to be turned on and off: the control and processing component 4 is configured to control the imaging component 1 to capture images, and process, in real time, the images captured by the imaging component 1 in a welding process.

In an embodiment of the present disclosure, the imaging component 1 is one of a charge coupled device, a complementary metal oxide semiconductor imaging device, a position-sensitive device and a charge injection device.

For example, the imaging component 1 employs the complementary metal oxide semiconductor imaging device, and the captured image is a grayscale image with a grayscale range from 0 to 255, in which the total row number M of the image is M=1200, and the total column number N of the image is N=1600. The first directional light source group 21 employs a directional LED (light-emitting diode) bar light source with a dimension of 86 mm (millimeter)×34 mm×20 mm and a power of 5.7 W (Watt). The second directional light source group 22 employs the same kind of light source as the first directional light source group 21. The structured light source 3 employs a 660 nm (nanometer) single line laser light source and has a power of 50 mW. Five weld passes can be seen on the workpiece surface at the same layer, and each weld pass 51 has a maximum protrusion degree of less than 0.3 mm. During the welding process, the total number num of workpiece surface images captured by the imaging component is 999, and the total time Time required to capture num workpiece surface images by the imaging component 1 is 33.3 seconds; let T be Time/num=33.33 ms and suppose n to be any non-negative integer less than num/3.

Figure 5:
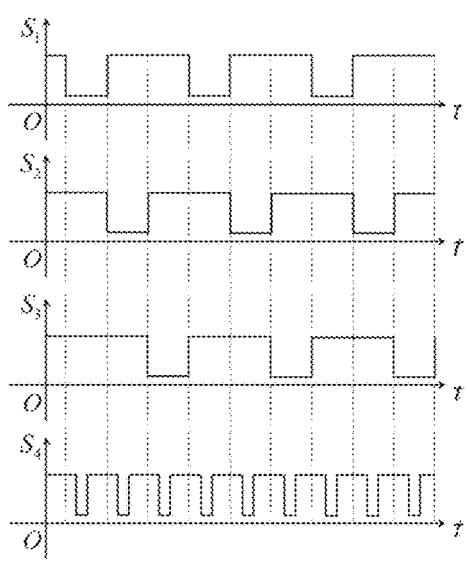
FIG. 5 shows a timing diagram of four square wave signals emitted by a control and processing component in an embodiment of the present disclosure.

In the apparatus according to the embodiments of the present disclosure, the control and processing component 4 includes a programmable logic controller and an industrial computer. The industrial computer sends control instructions to the programmable logic controller to cause the programmable logic controller to emit four square wave signals $S_1$, $S_2$, $S_3$ and $S_4$ which are used to trigger the first directional light source group 21, the second directional light source group 22, the structured light source 3 and the imaging component 1. FIG. 5 shows a timing diagram of the four square wave signals emitted by the control and processing component 4 in the embodiment of the present disclosure, in which on the horizontal axis t means any non-negative time that is not greater than Time. The period of the square wave signal $S_4$ is set to T. The periods of the square wave signals $S_1$, $S_2$ and $S_3$ are equal and set to 3T. The first directional light source group 21 is turned on during a low level of the square wave signal $S_1$, and turned off during a high level thereof. The second directional light source group 22 is turned on during a low level of the square wave signal $S_2$, and turned off during a high level thereof. The structured light source 3 is turned on during a low level of the square wave signal $S_3$, and turned off during a high level thereof. The imaging component 1 starts exposure from a falling edge of the square wave signal $S_4$ until a rising edge of the square wave signal $S_4$ arrives, so as to complete acquisition of a single frame image.

According to the timing diagram in FIG. 5, under the control of the square wave signals emitted by the control and processing component 4, the first directional light source group 21, the second directional light source group 22 and the structured light source 3 are sequentially turned on periodically in a cycle of 3T, and the imaging component 1 captures the image in a cycle of T when the first directional light source group 21, the second directional light source group 22 and the structured light source 3 are separately turned on. The purpose of using the first directional light source group 21 and the second directional light source group 22 is to artificially construct the directional light and shadow features at a weld pass boundary to obtain the workpiece surface images containing the directional light and shadow features; while the purpose of using the structured light source 3 is to obtain a structured light stripe image on the workpiece surface. In a period of 3nT<t<(3n+3)T, FIGS. 6, 7 and 8 respectively show a workpiece surface image captured by the imaging component 1 when the first directional light source group 21, the second directional light source group 22 and the structured light source 3 are separately turned on alone according to the embodiments of the present disclosure, which are denoted by image $I_{1,n}(x,y)$, image $I_{2,n}(x,y)$, image $I_{3,n}(x,y)$ respectively, in which x and y are any positive integers representing the row and column coordinates of the workpiece surface image, respectively, and x≤M, y≤N. In the embodiment of the present disclosure, the trajectory position of the weld pass 51 will be accurately calculated based on the workpiece surface images.

Figure 6:
FIG. 6 is a workpiece surface image captured by an imaging component when a first directional light source group is turned on alone according to an embodiment of the present disclosure.
Figure 7:
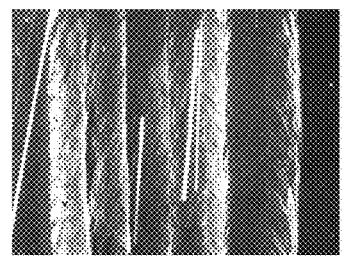
FIG. 7 is a workpiece surface image captured by an imaging component when a second directional light source group is turned on alone according to an embodiment of the present disclosure.
Figure 8:
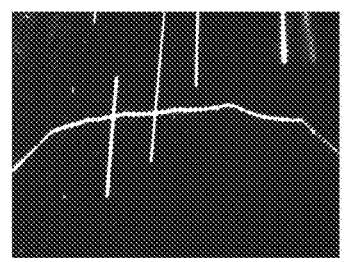
FIG. 8 is a workpiece surface image captured by an imaging component when a structured light source is turned on alone according to an embodiment of the present disclosure.

In the welding process, the arc light and spatter interference will seriously affect the image quality, and a very serious arc light and spatter interference can be seen in FIGS. 6, 7 and 8. Therefore, the images $I_{1,n}(x,y)$, $I_{2,n}(x,y)$ and $I_{3,n}(x,y)$ must be pre-processed to remove the arc light and spatter interference before extracting the trajectory position of the weld pass 51. The common features of arc light and spatter are that the grayscale values of a local region interfered by arc light and spatter are large or even saturated in the image, and the spatial distributions of the arc light intensity and spatter are often random and time-varying. Therefore, an effective way to eliminate the arc light and spatter interference is to perform pixel-level fusion to form a new image by taking the minimum grayscale values of corresponding pixels in adjacent frame images. For the image $I_{3,n}(x,y)$ captured when the structured light source 3 is turned on alone, a pixel-level fused image $J_{3,n}(x,y)$ is obtained in a way of pixel-level fusion of the three adjacent frame images in the present embodiment, which is denoted by a formula of:

$$J_{3,n}(x,y)=\min\{I_{3,n}(x,y), I_{3,n-1}(x,y), I_{3,n-2}(x,y)\}$$

For the images $I_{1,n}(x,y)$ and $I_{2,n}(x,y)$ captured when the first directional light source group 21 and the second directional light source group 22 are separately turned on alone, if the way of performing pixel-level fusion to form a new image by taking the minimum grayscale values of corresponding pixels in adjacent frame images is adopted, it may make the overall grayscale values of the processed image pretty low. This is because the weld pass surface is often uneven and with tiny bulges and grooves, which is reflected in the image that there is a low grayscale region around a high grayscale region, and a high grayscale region around a low grayscale region. The relative motion between the welding gun 6 and the workpiece 5 during the welding process tends to cause that the high grayscale region of the previous frame image overlaps with the low grayscale region of the next frame image, or to cause that the low grayscale region of the previous frame image overlaps with the high grayscale region of the next frame image, which lowers the overall grayscale of the image formed by the way of taking the minimum grayscale values of corresponding pixels in adjacent frame images, and hence is not conducive to further processing. Therefore, in the embodiment of the present disclosure, a new image is formed by taking the minimum grayscale values of corresponding pixels in two adjacent frame images, and then a final processing result is obtained by taking the maximum grayscale values of corresponding pixels in two adjacent images obtained from the previous step. In such a way, images $J_{1,n}(x,y)$ and $J_{2,n}(x,y)$ from pixel-level fusion of adjacent frame images are obtained by formulas of:

$J_{1,n}(x,y)=\max\{\min\{I_{1,n}(x,y),I_{1,n-1}(x,y)\},\min\{I_{1,n-1}(x,y),I_{1,n-2}(x,y)\}\}$, and $J_{2,n}(x,y)=\max\{\min\{I_{2,n}(x,y),I_{2,n-1}(x,y)\},\min\{I_{2,n-1}(x,y),I_{2,n-2}(x,y)\}\}$.

Figure 9:
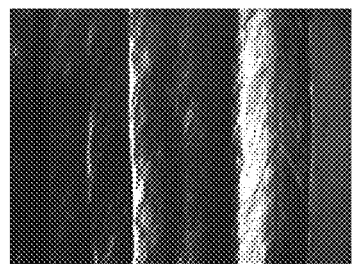
FIG. 9 is an image captured by an imaging component with arc light and spatter interference eliminated when a first directional light source group is turned on alone according to an embodiment of the present disclosure.
Figure 10:
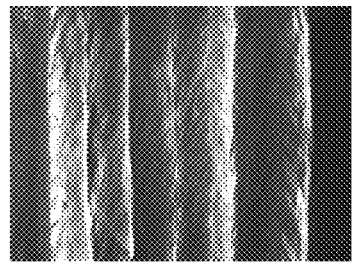
FIG. 10 is an image captured by an imaging component with arc light and spatter interference eliminated when a second directional light source group is turned on alone according to an embodiment of the present disclosure.
Figure 11:
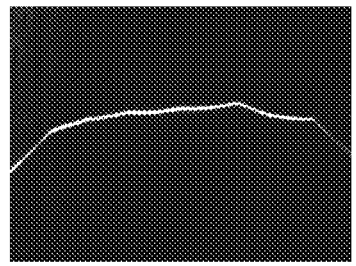
FIG. 11 is an image captured by an imaging component with arc light and spatter interference eliminated when a structured light source is turned on alone according to an embodiment of the present disclosure.

FIGS. 9, 10 and 11 respectively show an image captured by the imaging component 1 with arc light and spatter interference eliminated when the first directional light source group 21, the second directional light source group 22 and the structured light source 3 are separately turned on alone according to an embodiment of the present disclosure. After calculations of the above three formulas, the arc light and spatter interference is effectively eliminated.

Figure 12:
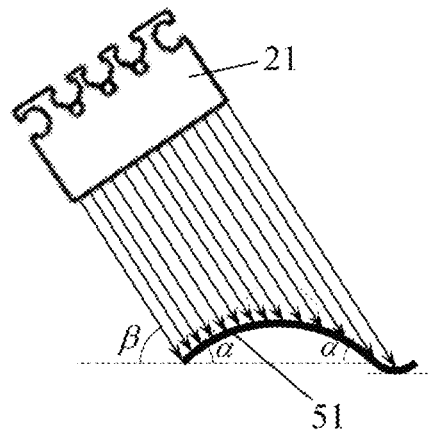
FIG. 12 shows a projection condition when a first directional light source group emits light onto a workpiece surface according to an embodiment of the present disclosure.

Due to the surface tension of a molten pool, the weld pass 51 always has slight bulges, but the surface at the boundary of adjacent weld passes 51 is smoother. FIG. 12 shows a projection condition when the first directional light source group 21 emits light onto the workpiece surface according to an embodiment of the present disclosure, in which α represents a weld toe angle at the weld pass boundary and β represents a projection angle of the first directional light source group 21. According to the theory of geometrical optics, when the first directional light source group 21 is turned on alone, the ratio of the irradiance on the left and right sides of the weld pass 51 in FIG. 12 is about $\sin(\beta+\alpha)/\sin(\beta-\alpha)$, indicating that the irradiance on the left side of the weld pass 51 is slightly greater than that on the right side. For the same reason, when the second directional light source group 22 is turned on alone, the irradiance on the right side of the weld pass 51 in FIG. 12 is slightly greater than that on the left side. However, the surface at the boundary of adjacent weld passes 51 is smoother, so that the irradiance is almost the same when the first directional light source group 21 and the second directional light source group 22 are separately turned on alone. Therefore, if the workpiece surface images captured by the imaging component 1 when the first directional light source group 21 and the second directional light source group 22 are separately turned on alone are subtracted from each other and the absolute value is taken, a "high grayscale—low grayscale—high grayscale" region may occur near the boundary of the adjacent weld passes 51. Certainly, since the weld pass surface is extremely irregular, the irradiance of some regions on the left side of the weld pass 51 may be lower than that on the right side when the first directional light source group 21 is turned on alone. However, as long as the irradiance of the weld pass 51 on both sides is different, and the surface at the boundary of adjacent weld passes 51 is smoother, the "high grayscale—low grayscale—high grayscale" region will still occur near the boundary of adjacent weld passes 51 if the workpiece surface images captured by the imaging component 1 when the first directional light source group 21 and the second directional light source group 22 are separately turned on alone are subtracted from each other and the absolute value is taken. In addition, the angle between the groove sidewall 52 and the light emitted from the directional light source array 2 is often far different from the angle between the weld pass 51 and the light emitted from the directional light source array 2, so a sharp grayscale change may occur at the boundary between the groove sidewall 52 and the weld pass 51. Combining the analysis above, if images $J_{1,n}(x,y)$ and $J_{2,n}(x,y)$ from pixel-level fusion of adjacent frame images are subtracted from each other and the absolute value is taken, a region with sharp grayscale changes will appear at the weld pass boundary.

A light and shadow differential image $D_n(x,y)$ denotes a result of subtracting the image $J_{1,n}(x,y)$ from the image $J_{2,n}(x,y)$ and taking the absolute value by a formals of:

$D_n(x,y)=|J_{1,n}(x,y)-J_{2,n}(x,y)|$.

Figure 13:
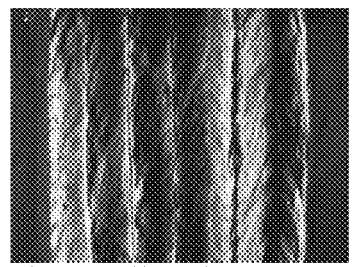
FIG. 13 is a light and shadow differential image obtained by calculation according to an embodiment of the present disclosure.

FIG. 13 shows the light and shadow differential image $D_n(x,y)$ obtained by calculation according to an embodiment of the present disclosure, and the region with sharp grayscale changes truly appears at the weld pass boundary, which verifies the above analysis result. In the embodiment of the present disclosure, the Sobel operator is utilized to calculate the first-order partial derivative value $D_{n,x}(x,y)$ of the light and shadow differential image $D_n(x,y)$ at the point (x,y) with respect to x, and to calculate the first-order partial derivative value $D_{n,y}(x,y)$ of the light and shadow differential image $D_n(x,y)$ at the point (x,y) with respect to y. The gradient distribution image $G_n(x,y)$ of the light and shadow differential image $D_n(x,y)$ is calculated by using the following formals of $G_n(x,y)=\sqrt{[D_{n,x}(x,y)]^2+[D_{n,y}(x,y)]^2}$.

Figure 14:
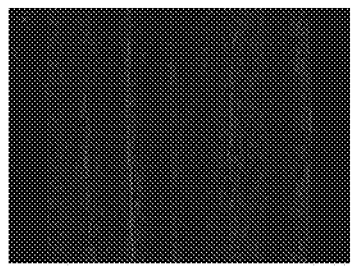
FIG. 14 is a gradient distribution image of a light and shadow differential image obtained by calculation according to an embodiment of the present disclosure.

FIG. 14 is a gradient distribution image $G_n(x,y)$ of the light and shadow differential image $D_n(x,y)$ obtained by calculation according to an embodiment of the present disclosure. The gradient value at the weld pass boundary is indeed large. The conventional image processing method to extract the positions of the weld pass boundary is to perform threshold segmentation. However, as can be seen from FIG. 14, although the gradient value at the weld pass boundary is indeed large, there are still many noise regions, and the gradient values of some noise regions are even greater than the weld pass boundary. Thus, the positions of the weld pass boundary cannot be effectively obtained by using the simple threshold segmentation method.

Figure 15:
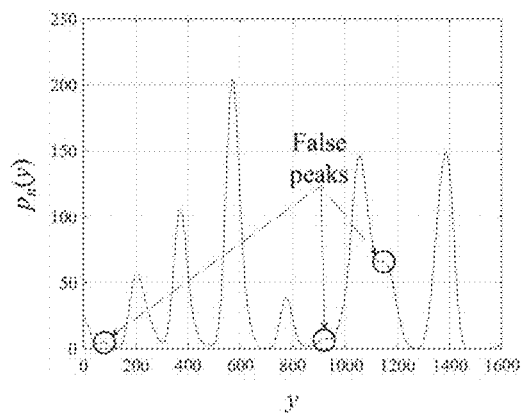
FIG. 15 is a $p_n(y)$ curve obtained by calculation according to an embodiment of the present disclosure.

According to the embodiment of the present disclosure, the processing methods for gradient distribution image $G_n(x,y)$ of the light and shadow differential image $D_n(x,y)$ is as follows: first, suppose K to be any positive integer greater than the number of the weld passes 51 to be detected, and K=50 in the embodiment of the disclosure, second, search top K points Π with largest gradient values in each row of FIG. 14; third, suppose $p_{0,n}(y)$ to be the number of points Π in the $y^{th}$ column of FIG. 14, and obtain $p_n(y)$ by performing low-pass filtering on $p_{0,n}(y)$, in which the low-pass filter is a 101-point FIR (finite impulse response) filter with a cut-off frequency of 0.01 designed by a window design method using the Hamming window function. FIG. 15 is a $p_n(y)$ curve obtained by calculation according to an embodiment of the present disclosure. In FIG. 15, except several false peaks, the positions of the peak points on the $p_n(y)$ curve substantially correspond to the positions of the weld pass boundary to be detected.

In order to eliminate the false peaks in FIG. 15, in the embodiment of the present disclosure, the peak points with small peak-to-peak values are removed on the one hand, and on the other hand, the non-maximum suppression operation is used to remove the peak points that are close to each other. Then for each valid peak points on the $p_n(y)$ curve, take the range of its FWHM (full width at half maximum) as its confidence interval, and the weld pass boundary should be within the confidence interval. The specific steps are as follows: first, let r be any positive real number less than 1, and let $gap_1$ be a positive integer not more than N: in the embodiment of the disclosure, r=0.1, and $gap_1$=50; second, let the confidence interval set U be an empty set initially, and let the valid peak position set $U_1$ be an empty set initially: third, each peak point $(y_i, p_n(y_i))$ on the $p_n(y)$ curve is processed one by one in descending order of the $p_n(y_i)$ value using the following way: if the peak-to-peak value of the peak point $(y_i, p_n(y_i))$ is greater than $r \cdot p_n(y_i)$, and the valid peak position set $U_1$ is an empty set or the difference between y; and any element in the valid peak position set $U_1$ is bigger than $gap_1$, calculate the range $[y_{L,i}, y_{R,i}]$ of the FWHM of the peak point $(y_i, p_n(y_i))$, add the range $[I_{L,i}, y_{R,i}]$ of the FWHM to the confidence interval set U, and add $y_i$ to the valid peak position set $U_1$, otherwise no action should be done, in which i is any positive integer not greater than the number of the peak points on the $p_n(y)$ curve: $y_i$, $y_{L,i}$ and $y_{R,i}$ are positive integers not greater than N, and $y_{L,i} \le y_i \le y_{R,i}$. The final confidence interval set U will contain the intervals where the weld pass boundary may be located. From the analysis above, it can be seen that the approximate positions of the weld pass boundary can be obtained using the images captured by the imaging component 1 when the directional light source array 2 is turned on. But the positions obtained may not be accurate enough, and only the pixel coordinates of the weld pass boundary can be obtained but not the three-dimensional coordinates. For this reason, it is necessary to fuse the image information captured by the imaging component 1 when the directional light source 2 is turned on and the image information captured by the imaging component 1 when the structured light source 3 is turned on to obtain a more accurate weld pass boundary detection result.

Figure 16:
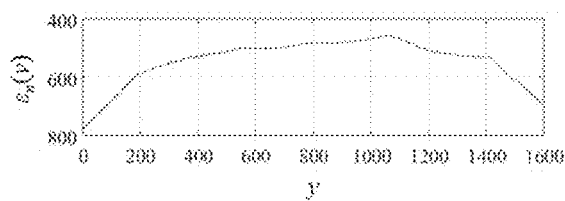
FIG. 16 is a $\varepsilon_n(y)$ curve obtained by calculation according to an embodiment of the present disclosure.

The image $J_{3,n}(x,y)$ is obtained by eliminating the arc and spatter interference after pixel-level fusion using the image $I_{3,n}(x,y)$ captured by the imaging component 1 when the structured light source 3 is turned on alone, as is shown in FIG. 11. Apply thresholding to the image $J_{3,n}(x,y)$, where the threshold is set to 30% of the maximum grayscale in the image $J_{3,n}(x,y)$. Then the binary image $B_n(x,y)$ is obtained after thresholding. The structured light stripe in the binary image $B_n(x,y)$ is subjected to a thinning process by scanning each column of the binary image $B_n(x,y)$, searching for a longest continuous line segment in each column, and considering the midpoint of the longest continuous line segment in each column as the center of the structured light stripe. Therefore, a structured light stripe with single pixel width would be obtained finally. Let $\varepsilon_n(y)$ be the row coordinate of the midpoint of the longest continuous line segment in the $y^{th}$ column of the binary image $B_n(x,y)$, and FIG. 16 is the $\varepsilon_n(y)$ curve obtained by calculation in the embodiment of the present disclosure.

Figure 17:
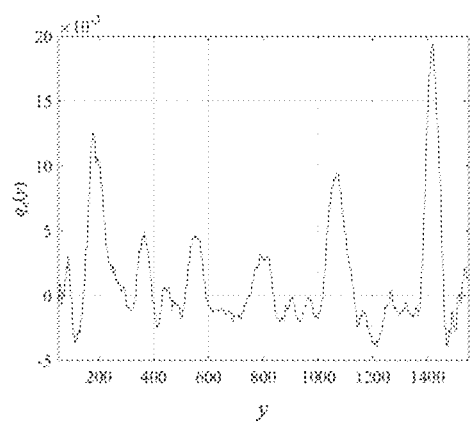
FIG. 17 is a $q_n(y)$ curve obtained by calculation according to an embodiment of the present disclosure.

The weld pass boundary points mathematically correspond to the points where the tangent slopes of the $\varepsilon_n(y)$ curve increase fastest locally, that is, the positive peak points on the second derivative curve of $\varepsilon_n(y)$. In the embodiment of the present disclosure, for each point on the $\varepsilon_n(y)$ curve, 101 points are selected symmetrically in its neighborhood and are fitted using three degree polynomial, so that the second derivative value of the point on the $\varepsilon_n(y)$ curve is calculated using the fitted polynomial. Denote the calculated second derivative of $\varepsilon_n(y)$ by $q_n(y)$. FIG. 17 shows the $q_n(y)$ curve obtained by calculation in the embodiment of the present disclosure. Apply thresholding to the $q_n(y)$ curve: find the positive peak points on the $q_n(y)$ curve whose second derivative values are larger than the average value of the $q_n(y)$ curve, which are considered as the possible candidate points of the weld pass boundary. The specific steps are as follows: let the candidate point set V be an empty set initially; for each positive peak point $(y_j, q_n(y_j))$ on the $q_n(y)$ curve, add $y_j$ to the candidate point set V if $q_n(y_j)$ is greater than the average value of the $q_n(y)$ curve, otherwise no operation is performed, in which j is any positive integer not greater than the number of positive peak points on the $q_n(y)$ curve, and y is the image column coordinate of the $j^{th}$ positive peak point on the $q_n(y)$ curve. The final candidate point set V contains the possible candidate points of the weld pass boundary, which are obtained from the image captured by the imaging component 1 when the structured light source 3 is turned on alone. In the present embodiment, the candidate point set V contains 45 candidate points.

Based on the above processing results, the confidence interval set U calculated from the images captured by the imaging component 1 when the directional light source array 2 is turned on contains the intervals where the weld pass boundary may be located, but there may be some deviations from the actual positions; when the structured light source 3 is turned on alone, the image captured by the imaging component 1 contains the information of the possible candidate points of the weld pass boundary. More accurate detection results can be obtained by fusing these two kinds of information. For any interval in the confidence interval set U, if there are many elements in the candidate point set V which are located in this interval, the one having the largest $q_n(y)$ value among these elements is taken as the possible candidate point of the weld pass boundary. The specific steps are as follows: let the fused candidate point set W of the weld pass boundary be an empty set initially; for each interval $[u_{L,s}, u_{R,s}]$ in the confidence interval set U, if there are elements $v_1, v_2, \ldots, v_m$ the candidate point set V located in the interval $[u_{L,s}, u_{R,s}]$ and $q_n(v_1) \ge q_n(v_2) \ge \ldots \ge q_n(v_m)$, add $v_1$ to the fused candidate point set W of the weld pass boundary, otherwise no operation is performed, in which $u_{L,s}, u_{R,s}$, m and $v_1, v_2, \ldots, v_m$ are positive integers, and s is a positive integer that is not greater than the number of the elements in the confidence interval set U.

Figure 18:
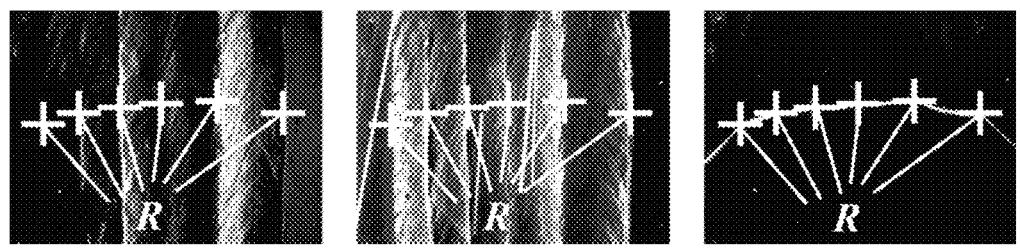
FIG. 18 shows positions of a weld pass boundary obtained by calculation according to an embodiment of the present disclosure.

After the above fusion process, the fused candidate point set W of the weld pass boundary is the result fusing the information from the confidence interval set U and the candidate point set V. The fused candidate point set W of the weld pass boundary contains the positions of both the exact and the invalid weld pass boundary points. For this reason, the non-maximum suppression operation is performed to remove the invalid weld pass boundary points according to the value of $q_n(y)$. The specific steps are as follows: let $gap_2$ be a positive integer not more than N, and in the embodiment of the present disclosure, $gap_2 = 50$; let the weld pass boundary point set R be an empty set initially, and perform the following operations for each element $w_k$ in the fused candidate point set W of the weld pass boundary in descending order of the $q_n(w_k)$ value: if the weld pass boundary point set R is an empty set or the difference between $w_k$ and the first component of any element in the weld pass boundary point set R is greater than $gap_2$, add the point $(w_k, \varepsilon_n(w_k))$ to the weld pass boundary point set R, otherwise no operation is performed, in which $w_k$ is a positive integer, and k is a positive integer that is not greater than the number of the elements in the fused candidate point set W of the weld pass boundary. Output the elements in the weld pass boundary point set R as the pixel coordinates of the positions of the weld pass boundary to be detected. FIG. 18 shows the positions of the weld pass boundary obtained by calculation in the embodiment of the present disclosure, in which the result of the weld pass boundary point set R is marked by the crosses.

In order to obtain the three-dimensional position information of weld pass boundary points further, an imaging component coordinate system $\{C\}$ is established, in which the origin of the imaging component coordinate system $\{C\}$ is located at the optical center of the imaging component 1. The intrinsic parameters of the imaging component 1 are calibrated by Zhang Zhengyou calibration method, and the transformation function $F(\sigma)$ from pixel coordinate in the image to the coordinate in the imaging component coordinate system $\{C\}$ can be obtained, where $\sigma$ is any element in the weld pass boundary point set R. According to the imaging model of the imaging component 1 established by the Zhang Zhengyou calibration method, in the imaging component coordinate system $\{C\}$, the corresponding three-dimensional coordinate $\Sigma$ to any element $\sigma$ in the weld pass boundary point set R meets the equation of a line that passes through the optical center of the imaging component 1 and is with $F(\sigma)$ as a direction vector, i.e., $$\Sigma = \rho \cdot F(\sigma)$$

in which $\rho$ is an undetermined coefficient.

In addition, $\Sigma$ should also meet the structured light plane equation of the structured light source 3. According to the Zhang Zhengyou calibration method, the normal vector $\mu$ of the structured light plane of the structured light source 3 can be obtained in the imaging component coordinate system $\{C\}$; the directed distance $\lambda$ between the origin of the imaging component coordinate system $\{C\}$ and the structured light plane of the structured light source 3 can be obtained as well. Considering $\Sigma$ meets the structured light plane equation of the structured light source 3, the following formula can be obtained:

$$\mu^T \Sigma = \lambda.$$

Therefore, $\Sigma$ can be calculated by a formula of $$\Sigma = \frac{\lambda}{\mu^T F(\sigma)} F(\sigma).$$

Output $\Sigma$ as the three-dimensional coordinates of the weld pass boundary to be detected, by which the multilayer multipass welding trajectory is finally obtained.

In the embodiment of the present disclosure, the angle between the weld pass trajectory to be detected and the column coordinate axis of the workpiece surface image is not more than 45°. If the angle between the weld pass trajectory to be detected and the column coordinate axis of the workpiece surface image is greater than 45°, the row operations in the above image processing steps should be changed to the column operations, and the column operations should be changed to the row operations. For convenience, if the angle between the weld pass trajectory to be detected and the column coordinate axis of the workpiece surface image is greater than 45°, the image $I_{1,n}(x,y)$, the image $I_{2,n}(x,y)$ and the image $I_{3,n}(x,y)$ denote the rotated images, which are obtained by rotating 90° from the workpiece surface images captured by the imaging component 1 when the first directional light source group 21, the second directional light source group 22, and the structured light source 3 are separately turned on alone at the time of $3nT \leq t < (3n+3)T$.

In conclusion, the method for detecting the multilayer multipass welding trajectory is performed by the control and processing component 4 and includes the following actions:

action 1: denoting a first directional light source group 21, a second directional light source group 22, and a structured light source 3 by a light source $L_1$, a light source $L_2$, and a light source $L_3$; supposing $\xi$, $\zeta$, $\eta$ to be any arrangement of the numbers 1, 2 and 3, in which $\xi$, $\zeta$, $\eta$ are positive integers that are not equal to each other (for example, $\xi=1$, $\zeta=2$ and $\eta=3$ in an embodiment of the present disclosure, or $\xi=2$, $\zeta=1$ and $\eta=3$ in another embodiment of the present disclosure); supposing num to be the total number of workpiece surface images captured by the imaging component 1 in a welding process, in which num is a multiple of 3; supposing lime to be the total time required to capture num workpiece surface image(s) by the imaging component 1 in the welding process; supposing t to be any non-negative time that is not greater than Time; letting T be Time/num: supposing n to be any non-negative integer less than num/3;

action 2: at any time of $3nT \leq t < (3n+1)T$, emitting a first control signal to make the light source $L_\xi$ turn on and to make the light source $L_\zeta$ and the light source $L_\eta$ turn off, and enabling the imaging component 1 to capture the workpiece surface image when the light source $L_\xi$ is turned on alone;

action 3: at any time of $(3n+1)T \leq t < (3n+2)T$, emitting a second control signal to make the light source $L_\zeta$ turn on and to make the light source $L_\xi$ and the light source $L_\eta$ turn off, and enabling the imaging component 1 to capture the workpiece surface image when the light source $L_\zeta$ is turned on alone;

action 4: at any time of $(3n+2)T \leq t < (3n+3)T$, emitting a third control signal to make the light source $L_\eta$ turn on and to make the light source $L_\xi$ and the light source $L_\zeta$ turn off, and enabling the imaging component 1 to capture the workpiece surface image when the light source $L_\eta$ is turned on alone:

action 5: if an angle between a weld pass trajectory to be detected and a column coordinate axis of the workpiece surface image is not more than 45°, supposing the workpiece surface images captured by the imaging component 1 to be image $I_{1,n}(x,y)$, image $I_{2,n}(x,y)$ and image $I_{3,n}(x,y)$ when the first directional light source group 21, the second directional light source group 22 and the structured light source 3 are separately turned on at the time of $3nT \leq t < (3n+3)T$; if the angle between the weld pass trajectory to be detected and the column coordinate axis of the workpiece surface image is greater than 45°, supposing image $I_{1,n}(x,y)$, image $I_{2,n}(x,y)$ and image $I_{3,n}(x,y)$ to be the images obtained by rotating 90° from the workpiece surface images captured by the imaging component 1 when the first directional light source group 21, the second directional light source group 22 and the structured light source 3 are separately turned on at the time of $3nT \leq t < (3n+3)T$; x and y are any positive integers representing the row and column coordinates of the workpiece surface image, respectively, and $x \leq M$, $y \leq N$, in which M and N represent the total number of rows and the total number of columns of the workpiece surface image, respectively;

action 6: when $n \geq 2$, processing the image $I_{1,n}(x,y)$, image $I_{2,n}(x,y)$ and image $I_{3,n}(x,y)$, obtaining three-dimensional position information of weld pass boundary points according to a processed result of the image $I_{1,n}(x,y)$, image $I_{2,n}(x,y)$ and image $I_{3,n}(x,y)$, and finally achieving a multilayer multipass welding trajectory detection according to the three-dimensional position information.

Action 6 further includes the following steps:

a) operating grayscale values of pixels in the image $I_{1,n}(x,y)$, image $I_{2,n}(x,y)$ and image $I_{3,n}(x,y)$ respectively to obtain images $J_{1,n}(x,y)$, $J_{2,n}(x,y)$ and $J_{3,n}(x,y)$ by performing pixel-level fusion of adjacent frame images through calculation, in which the image $J_{1,n}(x,y)$ is obtained by calculating grayscale values of the pixels in images $I_{1,n}(x,y)$, $I_{1,n-1}(x,y)$ and $I_{1,n-2}(x,y)$ when the first directional light source group 21 is turned on alone; the image $J_{2,n}(x,y)$ is obtained by calculating grayscale values of the pixels in images $I_{2,n}(x,y)$, $I_{2,n-1}(x,y)$ and $I_{2,n-2}(x,y)$ when the second directional light source group 22 is turned on alone; the image $J_{3,n}(x,y)$ is obtained by calculating grayscale values of the pixels in images $I_{3,n}(x,y)$, $I_{3,n-1}(x,y)$ and $I_{3,n-2}(x,y)$ when the structured light source 3 is turned on alone, in which the images $J_{1,n}(x,y)$, $J_{2,n}(x,y)$ and $J_{3,n}(x,y)$ are denoted by formulas of:

$$J_{1,n}(x,y)=\max\{\min\{I_{1,n}(x,y),I_{1,n-1}(x,y)\},\min\{I_{1,n-1}(x,y),I_{1,n-2}(x,y)\}\},$$

$$J_{2,n}(x,y)=\max\{\min\{I_{2,n}(x,y),I_{2,n-1}(x,y)\},\min\{I_{2,n-1}(x,y),I_{2,n-2}(x,y)\}\}, \text{ and}$$

$$J_{3,n}(x,y)=\min\{I_{3,n}(x,y),I_{3,n-1}(x,y),I_{3,n-2}(x,y)\},$$

where max and min represent maximum and minimum values of elements in a set, respectively;

b) based on grayscale values of the pixels in the images $J_{1,n}(x,y)$ and $J_{2,n}(x,y)$ obtained by performing pixel-level fusion of adjacent frame images, processing the images $J_{1,n}(x,y)$ and $J_{2,n}(x,y)$, and calculating a light and shadow differential image $D_n(x,y)$ and a gradient distribution image $G_n(x,y)$ of the light and shadow differential image $D_n(x,y)$, in which $D_n(x,y)$ and $G_n(x,y)$ are denoted by formulas of:

$$D_n(x,y)=|J_{1,n}(x,y)-J_{2,n}(x,y)|, \text{ and}$$

$$G_n(x,y)=\sqrt{[D_{n,x}(x,y)]^2+[D_{n,y}(x,y)]^2},$$

where $D_{n,x}(x,y)$ represents a first-order partial derivative value of the light and shadow differential image $D_n(x,y)$ at a point (x,y) with respect to x, and $D_{n,y}(x,y)$ represents a first-order partial derivative value of the light and shadow differential image $D_n(x,y)$ at the point (x,y) with respect to y;

c) searching top K points Π with largest gradient values in each row of the gradient distribution image $G_n(x,y)$ of the light and shadow differential image $D_n(x,y)$, in which K is any positive integer greater than the number of the weld passes 51 to be detected: supposing $p_{0,n}(y)$ to be the number of points Π in the $y^{th}$ column of $G_n(x,y)$, and obtaining $p_n(y)$ by performing low-pass filtering on $p_{0,n}(y)$;

d) selecting any empty set as an initial confidence interval set U and an initial valid peak position set $U_1$, and processing each peak point $(y_i, p_n(y_i))$ on the $p_n(y)$ curve one by one in descending order of the $p_n(y_i)$ value using the following way: if a peak-to-peak value of the peak point $(y_i, p_n(y_i))$ is greater than $r \cdot p_n(y_i)$, and the valid peak position set $U_1$ is an empty set or a difference between $y_i$ and any element in the valid peak position set $U_1$ is bigger than gaps, calculating the range $[y_{L,i}, y_{R,i}]$ of the full width at half maximum of the peak point $(y_i, p_n(y_i))$, adding the range $[y_{L,i}, y_{R,i}]$ to the confidence interval set U, and adding $y_i$ to the valid peak position set $U_1$, otherwise no action should be done, in which i is any positive integer not greater than the number of the peak points on the $p_n(y)$ curve: $y_i$, $y_{L,i}$, and $y_{R,i}$ are positive integers not greater than N, and $y_{L,i} \leq y_i \leq y_{R,i}$; $gap_1$ is a positive integer not more than N; and r is any positive real number less than 1:

e) processing the image $J_{3,n}(x,y)$ using the following method: first, applying thresholding to the image $J_{3,n}(x,y)$ to obtain a binary image $B_n(x,y)$, in which the threshold is selected to be any real number from zero to a maximum grayscale value of the image $J_{3,n}(x,y)$: second, calculating a second derivative of $\varepsilon_n(y)$, denoted as $q_n(y)$, in which $\varepsilon_n(y)$ is a row coordinate of a midpoint of a longest continuous line segment in the $y^{th}$ column of the binary image $B_n(x,y)$; third, selecting any empty set as an initial candidate point set V, and for each positive peak point $(y_j, q_n(y_j))$ on the $q_n(y)$ curve, adding $y_j$ to the candidate point set V if $q_n(y_j)$ is greater than the average value of the $q_n(y)$ curve, otherwise no operation is performed, in which j is any positive integer not greater than the number of positive peak points on the $q_n(y)$ curve, and $y_i$ is the image column coordinate of the $j^{th}$ positive peak point on the $q_n(y)$ curve:

f) selecting any empty set as an initial fused candidate point set W of the weld pass boundary: for each interval $[u_{L,s}, u_{R,s}]$ in the confidence interval set U, if there are elements $v_1, v_2, \ldots, v_m$ in the candidate point set V located in the interval $[u_{L,s}, u_{R,s}]$ and $q_n(v_1) \geq q_n(v_2) \geq \ldots \geq q_n(v_m)$, adding $v_1$ to the fused candidate point set W of the weld pass boundary, otherwise no operation is performed, in which $u_{L,s}$, $u_{R,s}$, m and $v_1, v_2, \ldots, v_m$ are positive integers, and s is a positive integer that is not greater than the number of the elements in the confidence interval set U;

g) selecting any empty set as an initial weld pass boundary point set R, and performing the following actions for each element $w_k$ in the fused candidate point set W of the weld pass boundary in descending order of the $q_n(w_k)$ value: if the weld pass boundary point set R is an empty set or the difference between $w_k$ and the first component of any element in the weld pass boundary point set R is greater than $gap_2$, adding the point $(w_k, \varepsilon_n(w_k))$ to the weld pass boundary point set R, otherwise no operation is performed, in which $w_k$ is a positive integer, k is a positive integer that is not greater than the number of the elements in the fused candidate point set W of the weld pass boundary, and $gap_2$ is a positive integer not more than N;

h) outputting the elements in the weld pass boundary point set R as pixel coordinates of the positions of the weld pass boundary to be detected;

i) establishing an imaging component coordinate system {C}, in which an origin of the imaging component coordinate system {C} is located at an optical center of the imaging component 1;

according to Zhang Zhengyou calibration method, calibrating intrinsic parameters of the imaging component 1 and calibrating a structured light plane equation of the structured light source 3 in the imaging component coordinate system {C}; combining the intrinsic parameters of the imaging component 1, and the structured light plane equation of the structured light source 3 in the imaging component coordinate system {C}, calculating the corresponding three-dimensional coordinate Σ to any element σ of the weld pass boundary point set R in the imaging component coordinate system {C} by a formula of:

$$\Sigma = \frac{\lambda}{\mu^T F(\sigma)} F(\sigma),$$

where µ is a normal vector of the structured light plane of the structured light source 3 in the imaging component coordinate system {C}, λ is a directed distance from the origin of the imaging component coordinate system {C} to the structured light plane of the structured light source 3; F(σ) is the transformation function from pixel coordinate in the image to the coordinate in the imaging component coordinate system {C}, in which F(σ) is completely determined by the intrinsic parameters of the imaging component 1; outputting Σ as the three-dimensional coordinates of positions of the weld pass boundary to be detected.

In the test on the industrial computer platform with a CPU (central processing unit) frequency of 2.30 GHz and a memory of 4G, the image processing time cost does not exceed 30 ms (millisecond) each time, and the maximum detection deviation is not more than 0.6 mm, which meets the requirements for an accurate and real-time multilayer multipass welding trajectory detection during welding process.

Compared with the prior art, the embodiments of the present disclosure can realize the following objects in trajectory detection during multilayer multipass welding process: fusing the directional light and shadow features of the weld pass boundary and the structured light sensing information, accurately recognizing the boundaries between the groove sidewall and the weld pass 51 and accurately recognizing the boundaries between the adjacent weld passes 51, and calculating the three-dimensional position information of the weld pass boundaries. The invention has the advantages of good real-time, simple structure and low cost, and can be applied to intelligent path planning and real-time automatic tracking during multilayer multipass welding process and other occasions such as additive manufacturing.

It should be noted that the above embodiments are merely illustrative of the present disclosure and are not intended to limit the scope of the invention; therefore, although the present specification has been described in detail with reference to the above embodiments, one of ordinary persons skilled in the art will understand that the present disclosure may be still modified or equivalently replaced, such as the device of the invention may include a filter component for filtering out the interference from the arc light during welding process, the filter component is located between the workpiece surface and the imaging component 1, the reflected light from the workpiece surface is captured by the imaging component 1 after passing through the filter component, a central wavelength of the filter component is within a sensitive wavelength range of the imaging component 1, and the light emitted from the first directional light source group 21, the second directional light source group 22 and the structured light source 3 is capable of passing through the filter component; the lighting order of the first directional light source group 21, the second directional light source group 22 and the structured light source 3 may be changed optionally, i.e., $\xi$, $\zeta$, $\eta$ may be any arrangement of 1, 2, 3; the first directional light source group 21, the second directional light source group 22 may be composed of one or more directional light sources. All of the technical solutions and their improvement without departing from the spirit and scope of the present disclosure should be encompassed by the scope of the claims of the present disclosure.

The present disclosure uses the directional light source array 2 to construct the directional lighting condition on both sides of the weld pass 51 to be detected, obtains the three-dimensional information of the cross section of the weld pass 51 to be detected using the structured light source 3, and turns on the light sources sequentially at a certain frequency by the control and processing component 4. The imaging component 1 captures the images when each light source is turned on separately, and then the control and processing component 4 calculates the three-dimensional information of the multilayer multipass welding trajectory after image processing and information fusion of multiple visual information at the directional illumination and the structured light illumination. The invention can obtain multiple visual features of the weld pass 51 to be detected nearly in the meantime, and is suitable for automatic recognition of multilayer multipass welding trajectory with low weld pass protrusion. The invention has the advantages of high recognition accuracy, good real-time performance, simple system structure and low cost, and it can be applied to intelligent path planning and real-time automatic tracking during multilayer multipass welding process and other occasions such as additive manufacturing.

What is claimed is:

1. An apparatus for detecting a multilayer multipass welding trajectory, comprising: an imaging component, a directional light source array, a structured light source and a control and processing component, the directional light source array comprising a first directional light source group and a second directional light source group; wherein the imaging component is disposed in front of a welding gun and above a weld pass, the first directional light source group and the second directional light source group are disposed above the weld pass and symmetrically at two sides of the weld pass, the structured light source is disposed above the weld pass and in front of the welding gun;

the control and processing component is configured to control the first directional light source group, the second directional light source group and the structured light source to emit light sequentially, configured to control the imaging component to capture a workpiece surface image separately when the first directional light source group, the second directional light source group or the structured light source is turned on alone to emit the light to a weld pass surface and configured to obtain a multilayer multipass welding trajectory according to the captured images.

2. The apparatus according to claim 1, wherein positions of the imaging component, the directional light source array, the structured light source and the welding gun are fixed.

3. The apparatus according to claim 1, wherein the control and processing component is connected with the first directional light source group, the second directional light source group, the structured light source and the imaging component by wires, or communicates with them through wireless transmission.

4. The apparatus according to claim 1, wherein the imaging component is one of a charge coupled device, a complementary metal oxide semiconductor imaging device, a position-sensitive device and a charge injection device.

5. The apparatus according to claim 1, further comprising: a filter component located between a workpiece surface and the imaging component, wherein reflected light from the workpiece surface is captured by the imaging component after passing through the filter component; a central wavelength of the filter component is within a sensitive wavelength range of the imaging component; and the light emitted from the first directional light source group, the second directional light source group and the structured light source is capable of passing through the filter component.

6. The apparatus according to claim 1, wherein the control and processing component is configured to emit four square wave signals to trigger the first directional light source group, the second directional light source group, the structured light source and the imaging component, and periods of the square wave signals for triggering the first directional light source group, the second directional light source group and the structured light source are equal and are set to 3 times a period of the square wave signal for triggering the imaging component.

7. A method for detecting a multilayer multipass welding trajectory, applied to an apparatus for detecting a multilayer multipass welding trajectory, wherein the apparatus comprises an imaging component, a directional light source array, a structured light source and a control and processing component, the directional light source array, comprising a first directional light source group and a second directional light source group, in which the imaging component is disposed in front of a welding gun and above a weld pass, the first directional light source group and the second directional light source group are disposed above the weld pass and symmetrically at two sides of the weld pass, and the structured light source is disposed above the weld pass; and the method is performed by the control and processing component and comprises the following actions:

action 1: denoting the first directional light source group, the second directional light source group, and the structured light source by a light source $L_1$, a light source $L_2$, and a light source $L_3$; supposing $\xi$, $\zeta$, $\eta$ to be any arrangement of the numbers 1, 2 and 3, in which $\xi$, $\zeta$, $\eta$ are positive integers that are not equal to each other; supposing num to be the total number of workpiece surface images captured by the imaging component in a welding process, in which num is a multiple of 3; supposing Time to be the total time required to capture num workpiece surface image(s) by the imaging component in the welding process; supposing t to be any non-negative time that is not greater than Time; letting T be Time/num; supposing n to be any non-negative integer less than num/3;

action 2: at any time of $3nT < t < (3n+1)T$, emitting a first control signal to make the light source $L_\xi$ turn on and to make the light source $L_\zeta$ and the light source $L_\eta$ turn off, and enabling the imaging component to capture the workpiece surface image when the light source $L_\xi$ is turned on alone;

action 3: at any time of $(3n+1)T < t < (3n+2)T$, emitting a second control signal to make the light source $L_\zeta$ turn on and to make the light source $L_\xi$ and the light source $L_\eta$ turn off, and enabling the imaging component to capture the workpiece surface image when the light source $L_\zeta$ is turned on alone;

action 4: at any time of $(3n+2)T < t < (3n+3)T$, emitting a third control signal to make the light source $L_\eta$ turn on and to make the light source $L_\xi$ and the light source $L_\zeta$ turn off, and enabling the imaging component to capture the workpiece surface image when the light source $L_\eta$ is turned on alone;

action 5: if an angle between a weld pass trajectory to be detected and a column coordinate axis of the workpiece surface image is not more than 45°, supposing the workpiece surface images captured by the imaging component to be image $I_{1,n}(x,y)$, image $I_{2,n}(x,y)$ and image $I_{3,n}(x,y)$ when the first directional light source group, the second directional light source group and the structured light source are separately turned on at the time of $3nT < t < (3n+3)T$; if the angle between the weld pass trajectory to be detected and the column coordinate axis of the workpiece surface image is greater than 45°, supposing image $I_{1,n}(x,y)$, image $I_{2,n}(x,y)$ and image $I_{3,n}(x,y)$ to be the images obtained by rotating 90° from the workpiece surface images captured by the imaging component when the first directional light source group, the second directional light source group and the structured light source are separately turned on at the time of $3nT < t < (3n+3)T$; x and y are any positive integers representing row and column coordinates of the workpiece surface image, respectively, and $x \leq M$, $y \leq N$, in which M and N represent the total number of rows and the total number of columns of the workpiece surface image, respectively;

action 6: when $n \geq 2$, processing the image $I_{1,n}(x,y)$, image $I_{2,n}(x,y)$ and image $I_{3,n}(x,y)$, obtaining three-dimensional position information of weld pass boundary points according to a processed result of the image $I_{1,n}(x,y)$, image $I_{2,n}(x,y)$ and image $I_{3,n}(x,y)$, and finally achieving a multilayer multipass welding trajectory detection according to the three-dimensional position information.

8. The method according to claim 7, wherein action 6 comprises the following steps:

a) operating grayscale values of pixels in the image $I_{1,n}(x,y)$, image $I_{2,n}(x,y)$ and image $I_{3,n}(x,y)$ respectively to obtain images $J_{1,n}(x,y)$, $J_{2,n}(x,y)$ and $J_{3,n}(x,y)$ by performing pixel-level fusion of adjacent frame images through calculation, wherein the image $J_{1,n}(x,y)$ is obtained by calculating grayscale values of the pixels in images $I_{1,n}(x,y)$, $I_{1,n-1}(x,y)$ and $I_{1,n-2}(x,y)$ when the first directional light source group is turned on alone; the image $J_{2,n}(x,y)$ is obtained by calculating grayscale values of the pixels in images $I_{2,n}(x,y)$, $I_{2,n-1}(x,y)$ and $I_{2,n-2}(x,y)$ when the second directional light source group is turned on alone; the image $J_{3,n}(x,y)$ is obtained by calculating grayscale values of the pixels in images $I_{3,n}(x,y)$, $I_{3,n-1}(x,y)$ and $I_{3,n-2}(x,y)$ when the structured light source is turned on alone, in which the images $J_{1,n}(x,y)$, $J_{2,n}(x,y)$ and $J_{3,n}(x,y)$ are denoted by formulas of:

$$J_{1,n}(x,y) = \max\{\min\{I_{1,n}(x,y), I_{1,n-1}(x,y)\}, \min\{I_{1,n-1}(x,y), I_{1,n-2}(x,y)\}\},$$

$$J_{2,n}(x,y) = \max\{\min\{I_{2,n}(x,y), I_{2,n-1}(x,y)\}, \min\{I_{2,n-1}(x,y), I_{2,n-2}(x,y)\}\}, \text{ and}$$

$$J_{3,n}(x,y) = \min\{I_{3,n}(x,y), I_{3,n-1}(x,y), I_{3,n-2}(x,y)\},$$

where max and min represent maximum and minimum values of elements in a set, respectively;

b) based on grayscale values of the pixels in the images $J_{1,n}(x,y)$ and $J_{2,n}(x,y)$ obtained by performing pixel-level fusion of adjacent frame images, processing the images $J_{1,n}(x,y)$ and $J_{2,n}(x,y)$, and calculating a light and shadow differential image $D_n(x,y)$ and a gradient distribution image $G_n(x,y)$ of the light and shadow differential image $D_n(x,y)$, in which $D_n(x,y)$ and $G_n(x,y)$ are denoted by formulas of:

$$D_n(x,y) = |J_{1,n}(x,y) - J_{2,n}(x,y)|, \text{ and}$$

$$G_n(x,y) = \sqrt{[D_{n,x}(x,y)]^2 + [D_{n,y}(x,y)]^2},$$

where $D_{n,x}(x,y)$ represents a first-order partial derivative value of the light and shadow differential image $D_n(x,y)$ at a point (x,y) with respect to x, and $D_{n,y}(x,y)$ represents a first-order partial derivative value of the light and shadow differential image $D_n(x,y)$ at the point (x,y) with respect to y;

c) searching top K points Π with largest gradient values in each row of the gradient distribution image $G_n(x,y)$ of the light and shadow differential image $D_n(x,y)$, in which K is any positive integer greater than the number of the weld passes to be detected; supposing $p_{0,n}(y)$ to be the number of points Π in the $y^{th}$ column of $G_n(x,y)$, and obtaining $p_n(y)$ by performing low-pass filtering on $p_{0,n}(y)$;

d) selecting any empty set as an initial confidence interval set U and an initial valid peak position set $U_1$, and processing each peak point $(y_i, p_n(y_i))$ on the $p_n(y)$, curve one by one in descending order of the $p_n(y_i)$ value using the following way: if a peak-to-peak value of the peak point $(y_i, p_n(y_i))$ is greater than $r \cdot p_n(y_i)$, and the valid peak position set $U_1$ is an empty set or a difference between v; and any element in the valid peak position set $U_1$ is bigger than $gap_1$, calculating the range $[y_{L,i}, y_{R,i}]$ of the full width at half maximum of the peak point $(y_i, p_n(y_i))$, adding the range $[y_{L,i}, y_{R,i}]$ to the confidence interval set U, and adding $y_i$ to the valid peak position set $U_1$, otherwise no action should be done, in which i is any positive integer not greater than the number of the peak points on the $p_n(y)$ curve; $y_i$, $y_{L,i}$ and $y_{R,i}$ are positive integers not greater than N, and $y_{L,i} \leq y_i \leq y_{R,i}$; $gap_1$ is a positive integer not more than N; and r is any positive real number less than 1;

e) processing the image $J_{3,n}(x,y)$ using the following way: first, applying thresholding to the image $J_{3,n}(x,y)$ to obtain a binary image $B_n(x,y)$, in which the threshold is selected to be any real number from zero to a maximum grayscale value of the image $J_{3,n}(x,y)$; second, calculating a second derivative of $\varepsilon_n(y)$, denoted as $q_n(y)$, wherein $\varepsilon_n(y)$ is a row coordinate of a midpoint of a longest continuous line segment in the $y^{th}$ column of the binary image $B_n(x,y)$; third, selecting any empty set as an initial candidate point set V, and for each positive peak point $(y_j, q_n(y_j))$ on the $q_n(y)$ curve, adding y to the candidate point set V if $q_n(y_j)$ is greater than the average value of the $q_n(y)$, curve, otherwise no action is performed, in which j is any positive integer not greater than the number of positive peak points on the $q_n(y)$, curve, and $y_j$ is the image column coordinate of the $j^{th}$ positive peak point on the $q_n(y)$ curve;

f) selecting any empty set as an initial fused candidate point set W of the weld pass boundary; for each interval $[u_{L,s}, u_{R,s}]$ in the confidence interval set U if there are elements $v_1, v_2, \ldots v_m$ in the candidate point set V located in the interval $[u_{L,s}, u_{R,s}]$ and $q_n(v_1) \geq q_n(v_2) \geq \ldots \geq q_n(v_m)$, adding $v_1$ to the fused candidate point set W of the weld pass boundary, otherwise no action is performed, in which $u_{L,s}$, $u_{R,s}$, m and $v_1$, $v_2, \ldots, v_m$ are positive integers, and s is a positive integer that is not greater than the number of the elements in the confidence interval set U;

g) selecting any empty set as an initial weld pass boundary point set R, and performing the following actions for each element $w_k$ in the fused candidate point set W of the weld pass boundary in descending order of the $q_n(w_k)$ value: if the weld pass boundary point set R is an empty set or the difference between $w_k$ and the first component of any element in the weld pass boundary point set R is greater than $gap_2$, adding the point $(w_k, \varepsilon_n(w_k))$ to the weld pass boundary point set R, otherwise no action is performed, in which $w_k$ is a positive integer, k is a positive integer that is not greater than the number of the elements in the fused candidate point set W of the weld pass boundary; and $gap_2$ is a positive integer not more than N;

h) outputting the elements in the weld pass boundary point set R as pixel coordinates of the positions of the weld pass boundary to be detected;

i) establishing an imaging component coordinate system $\{C\}$, in which an origin of the imaging component coordinate system $\{C\}$ is located at an optical center of the imaging component;

according to Zhang Zhengyou calibration method, calibrating intrinsic parameters of the imaging component and calibrating a structured light plane equation of the structured light source in the imaging component coordinate system $\{C\}$; combining the intrinsic parameters of the imaging component, and the structured light plane equation of the structured light source in the imaging component coordinate system $\{C\}$, calculating the corresponding three-dimensional coordinate $\Sigma$ to any element $\sigma$ of the weld pass boundary point set R in the imaging component coordinate system $\{C\}$ by a formula of:

$$\Sigma = \frac{\lambda}{\mu^T F(\sigma)} F(\sigma),$$

where $\mu$ is a normal vector of the structured light plane of the structured light source in the imaging component coordinate system $\{C\}$, $\lambda$ is a directed distance from the origin of the imaging component coordinate system $\{C\}$ to the structured light plane of the structured light source; $F(\sigma)$ is the transformation function from pixel coordinate in the image to the coordinate in the imaging component coordinate system $\{C\}$, in which $F(\sigma)$ is completely determined by the intrinsic parameters of the imaging component; outputting $\Sigma$ as the three-dimensional coordinates of positions of the weld pass boundary to be detected.

* * * * *